Feb. 5, 1952  R. B. SCHOONMAKER ET AL  2,584,743
MESSENGER WIRE CLAMP
Filed March 13, 1948
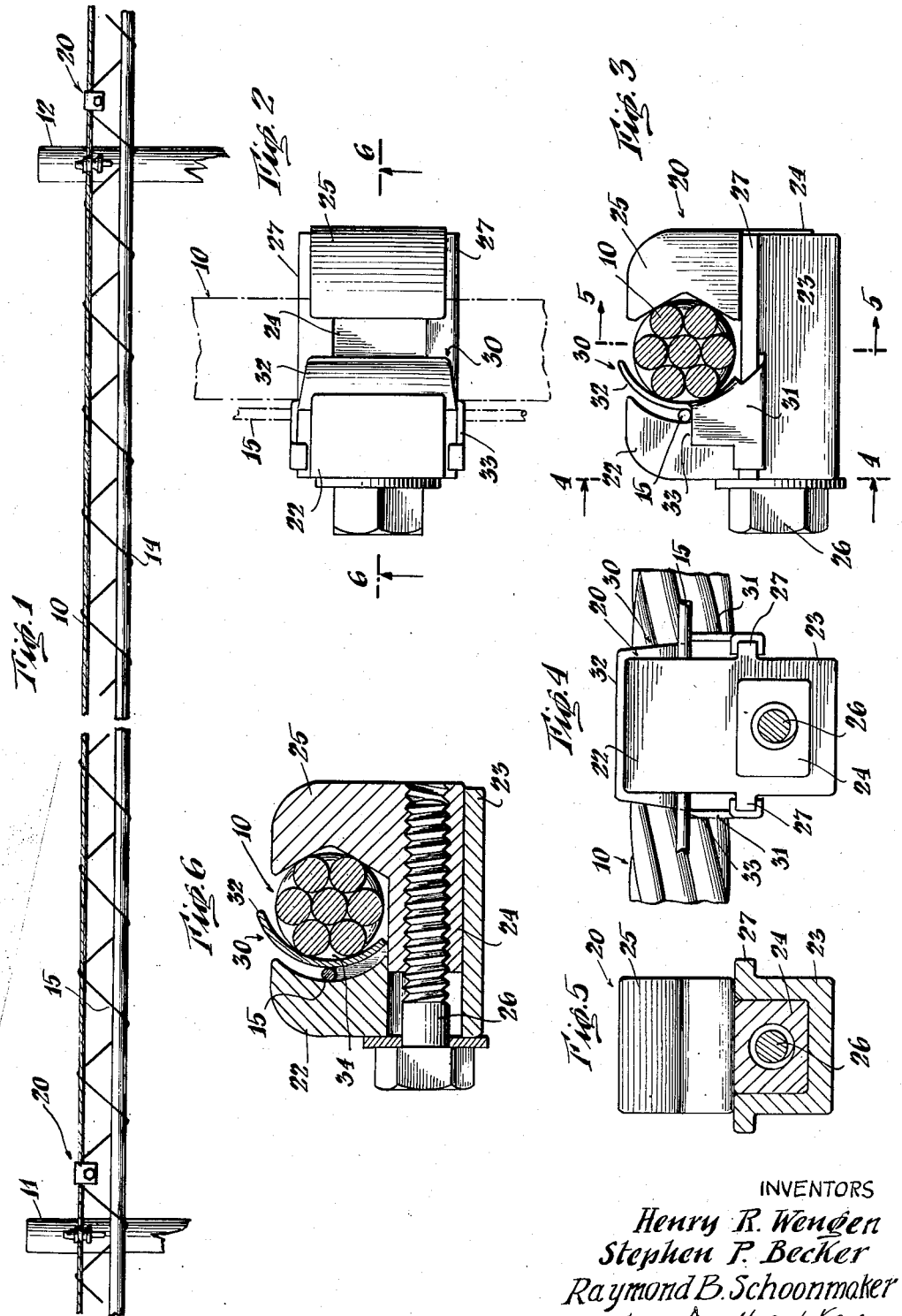
INVENTORS
Henry R. Wengen
Stephen P. Becker
Raymond B. Schoonmaker
by Duell and Kane
ATTORNEYS Patented Feb. 5, 1952

2,584,743

UNITED STATES PATENT OFFICE 2,584,743

MESSENGER WIRE CLAMP

Raymond B. Schoonmaker, Stephen P. Becker, and Henry R. Wengen, Poughkeepsie, N. Y., assignors to Fargo Mfg. Company, Inc., Poughkeepsie, N. Y., a corporation of New York Application March 13, 1948, Serial No. 14,676

4 Claims. (Cl. 24—81)

This invention relates to an improved clamp for securing a small diameter wire or strand relative to a cable of substantially larger diameter.

Aerial cables such as telephone or power cables have appreciable weight and are ordinarily hung or suspended from a "messenger" cable which has the requisite tensile strength to support the run of aerial cable between the relatively widely-spaced towers. Aerial cable has been suspended from the messenger by individual hangers which encircle the cable and are clipped to the messenger. The hangers are closely spaced, to give proper support to the cable, and the material and installation costs have been high; and it is now becoming common practice to suspend the cable from the messenger by means of a lashing wire which is wrapped about the messenger and the cable. This is done as a continuous spinning operation, with substantial savings in labor and material costs.

It is of great importance to provide means for easily and securely fastening the lashing wire to the messenger at the commencement of a run and at such intervals along the run as may be necessary or desirable. Messenger cable is used in diameters of from ¼ inch to ⅞ inch according to the weight of aerial cable to be carried thereby, and the lashing wire sizes also are selected to most economically meet the requirements of the installation. The lashing wire, which is of relatively much smaller diameter than the messenger cable, must be prevented from slipping relative thereto. A frequent cause of slippage was the entry of the lashing wire into the lay of the cable, a condition which is completely eliminated by the present invention.

It is therefore a principal object of the invention to provide improved means for anchoring a lashing wire relative to a messenger in aerial cable installations.

It is another object of the invention to provide an improved clamping means which can be manufactured at low cost and will accommodate various sizes of messenger and various sizes of lashing wire.

It is a further object of the invention to provide a lashing wire clamp having an adjustable spacer or guard plate which lies against the messenger and provides a smooth wall against which the lashing wire may be securely clamped and prevented from dropping into the lay of the messenger cable.

It is yet another object of the invention to provide a lashing wire clamp which may easily be applied to existing lashing wire installations if it should be necessary to supplement or replace existing clamping devices.

Other features and advantages will hereinafter appear.

In the accompanying drawings:

Fig. 1 is a schematic view of a messenger cable supporting an aerial cable between spaced poles by means of a lashing wire secured by the present invention;

Fig. 2 is a top plan view of the lashing wire clamp, with the messenger and the lashing wire indicated in dotted line;

Fig. 3 is a side elevation of the clamp with the messenger wire and the lashing wire in position;

Fig. 4 is an end elevation, in section through lines 4—4 of Fig. 3;

Fig. 5 is an end sectional elevation, taken on lines 5—5 of Fig. 3; and

Fig. 6 is a vertical lateral section taken on lines 6—6 of Fig. 2.

Referring to the drawings for a more complete description of the invention, a messenger cable 10 secured to successive poles or towers 11, 12 supports an aerial cable 14 by means of a lashing wire 15 which wraps about the messenger and cable in a series of relatively closely spaced loops. The lashing wire is affixed to the messenger at any suitable intervals by means of a clamp 20 embodying the present invention.

A main body portion of the clamp 20 has a rigid jaw 22 extending upwardly from an end of a channel-like base 23. Said base provides a trackway or guide-way to slidably accommodate the base portion 24 of a second jaw member which includes a heavy jaw structure 25 for cooperation with the jaw 22. Preferably the jaw 25 has a V-shaped inner face, whereas the face of jaw 22 is arcuate on a radius which centers on a plane through the apex of the V, and is not less than the radius of the largest messenger cable within the size range of the clamp. The V-shaped jaw properly centers the cable within the clamp.

The body portion 24 is tapped to receive the clamping screw 26, the head of which abuts against the jaw end of the body base 23. It is conventional to interpose a washer between the body and screw head, as shown.

As clearly appears in Figs. 3 and 4, the body base member 23 has external flanges or guides 27 for slidably carrying the spacer member 30. Said spacer member is most desirably a sheet metal stamping formed with side walls 31 which embrace the guides 27, and a cover plate 32 which curves in substantial conformity to the curvature of the jaw member 22, adjacent to which it is positioned as shown in Figs. 3 and 6. It will be noted that the upper edges of side walls 31 provide spaced supporting surfaces 33 for the lashing wire. Said surfaces are substantially at the center of jaw 22 and in line with the apex of the V-jaw 25 so that the lashing wire 15, when in position, will be substantially centered with respect to the messenger secured therein throughout the full range of messenger cable diameters which can be accommodated by the clamp.

The cover 32 overlies a side face or area of the messenger and provides a firm surface cooperating with the jaw 22 to receive and clamp the lashing wire 15. The continuous support of the lashing wire in centered relationship relative to the messenger provided by the side walls 31 prevents the lashing wire from working into a lower quadrant position, as viewed in Fig. 6, and thereby loosening within the clamp. The cover 32 prevents the small diameters lashing wire from entering the "lay groove" 34 of the messenger and it is apparent that when the clamp is made up tightly on the messenger, the conditions which largely contribute to the slippage of the lashing wire are reduced to a minimum.

When the clamp is being installed, it is first placed about the messenger and made up to an extent whereby the relative spacing between the upper end of the cover 32 and the upper edge of the V-jaw will prevent the clamp from dropping from the messenger. The lineman then moves the cover plate 32 toward the messenger to open a gap between the cover of the jaw 22 sufficient to receive the lashing wire, whereupon the entire structure may be made fast. The facility with which the clamps may be applied to the messengers and the lashing wires supported thereby makes it easy to install or replace clamps or existing installations.

Although the invention has been described by making a fully detailed reference to the certain presently preferred embodiments, such detail of description is to be understood in an instructive rather than a limiting sense, many changes being possible within the scope of the claims hereto annexed.

We claim:

1. Means for securing a small diameter strand relative to a strand of much larger diameter, comprising a clamp having jaws movable relative to each other, one of said jaws having divergent surfaces defining a groove within which said larger diameter strand will be centered, and the other of said jaws having a concave clamping surface the center of curvature of which is substantially in the plane of the base of said groove and the radius of which is not less than the radius of the larger strand; a concavo-convex spacer plate disposed intermediate said jaws, said plate having a curvature substantially equal to the curvature of said concave-face jaw and disposed with its convex surface facing said jaw; spaced wall means on said plate defining a supporting surface for said small diameter strand, the plane of said surface being substantially in line with the apex of said jaw groove; means for slidably supporting said plate relative to said jaws; and means for moving said jaws into clamping position whereby said large strand is engaged by said grooved jaw and the spaced plate and the small strand is engaged by the curved jaw and the spacer plate.

2. Means for clamping a small diameter strand in fixed relation to a substantially larger strand, comprising a jaw member having a channel-like base extending therefrom, said base having outwardly extending flange means extending lengthwise thereof, and a second jaw member having a base portion slidably disposed within said channel-like base, each said jaw member having mutually opposed concave clamping faces; a spacer member having a concavo-convex wall extending parallel to the clamping face of one of said jaws and having a radius of curvature substantially equal to the radius of curvature of said jaw face; support means extending from said spacer member and slidably engaging said flange means to support said spacer member thereon with the convex surface of its wall facing the said one jaw, said support means providing at their upper portions, spaced areas of support for said small diameter strand, and said jaw means being movable relative to each other and to said spacer member to permit said large diameter strand to be placed between one jaw member and the spacer member and the small diameter strand to be placed between the other jaw member and the spacer member; and means for causing the respective jaw members and spacer member to securely grip the respective strands as aforesaid.

3. Means for securing a small diameter strand to a strand of much larger diameter, comprising a clamp having rigid jaws movable relative to each other, said jaws having slidably interfitting base portions; a spacer member having a concavo-convex plate disposed between said jaws and extending parallel thereto, said spacer member having side walls respectively overlying the side walls of one of said jaws and the upper edge of said spacer member walls disposed substantially equidistantly between the upper and lower edges of said jaw and collectively defining means for supporting said small diameter strand relative to said jaw; and screw threaded means engaging the respective base portions of said jaws to effect relative movement thereof.

4. Means for securing a small diameter strand to a strand of much larger diameter comprising a clamp having rigid jaws movable relative to each other, said jaws having slidably interfitting base portions; a spacer member having a concavo-convex plate disposed between said jaws and extending parallel thereto, said spacer member having side walls respectively overlying the side walls of one of said jaws and the upper edge of said spacer member walls disposed substantially above the lower edge of said jaw and collectively defining means for supporting said small diameter strand relative to said jaw; and screw threaded means engaging the respective base portions of said jaws to effect relative movement thereof.

RAYMOND B. SCHOONMAKER.
STEPHEN P. BECKER.
HENRY R. WENGEN.

REFERENCES CITED

The following references are of record in the file of this patent:

UNITED STATES PATENTS

| Number | Name | Date |
|---|---|---|
| 1,646,255 | Muehleman | Oct. 18, 1927 |
| 2,219,846 | Meyer | Oct. 29, 1940 |
| 2,456,808 | Becker | Dec. 21, 1948 |